United States Patent
Iwai

(10) Patent No.: US 9,069,279 B2
(45) Date of Patent: Jun. 30, 2015

(54) OPTICAL SCANNING APPARATUS AND IMAGE FORMING APPARATUS INCLUDING THE OPTICAL SCANNING APPARATUS

(71) Applicant: CANON KABUSHIKI KAISHA, Tokyo (JP)

(72) Inventor: Hitoshi Iwai, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/923,154

(22) Filed: Jun. 20, 2013

(65) Prior Publication Data

US 2013/0342628 A1     Dec. 26, 2013

(30) Foreign Application Priority Data

Jun. 22, 2012   (JP) .................... 2012-140741

(51) Int. Cl.

| | |
|---|---|
| B41J 2/435 | (2006.01) |
| B41J 27/00 | (2006.01) |
| G03G 15/043 | (2006.01) |
| G02B 26/10 | (2006.01) |
| G02B 26/12 | (2006.01) |
| G03G 15/04 | (2006.01) |
| G03G 21/16 | (2006.01) |

(52) U.S. Cl.
CPC ............ *G03G 15/0435* (2013.01); *G02B 26/10* (2013.01); *G02B 26/12* (2013.01); *G03G 15/04072* (2013.01); *G03G 21/1619* (2013.01); *G03G 21/1666* (2013.01)

(58) Field of Classification Search
CPC .. G02B 26/123; G02B 26/124; G02B 6/0098; G03G 15/04072

USPC .................. 347/238, 241–245, 256–258, 263
See application file for complete search history.

(56) References Cited

U.S. PATENT DOCUMENTS

| | | | | |
|---|---|---|---|---|
| 6,992,690 B2 * | 1/2006 | Mogi et al. | .................... | 347/238 |
| 8,542,263 B2 * | 9/2013 | Yamashita | .................... | 347/242 |
| 2013/0222876 A1 * | 8/2013 | Sato et al. | .................. | 359/212.1 |

FOREIGN PATENT DOCUMENTS

| | | | | | |
|---|---|---|---|---|---|
| JP | 09243944 A | * | 9/1997 | ................. | B41J 2/44 |
| JP | 11202232 A | * | 7/1999 | ................. | B41J 2/44 |
| JP | 2004-37836 A | | 2/2004 | | |
| JP | 2008145953 A | * | 6/2008 | ................. | B41J 2/44 |

* cited by examiner

*Primary Examiner* — Hai C Pham
(74) *Attorney, Agent, or Firm* — Canon USA Inc IP Division

(57) ABSTRACT

An optical scanning apparatus includes a light source configured to emit a light beam, a rotating polygon mirror configured to deflect the light beam such that the light beam scans a photosensitive member, an optical box to which the rotating polygon mirror is attached and which includes a first portion, and a holding member configured to hold the light source, including a second portion and a protrusion portion, and attached to the optical box such that the first portion of the optical box and the second portion of the holding member form a gap therebetween, wherein the holding member is attached to the optical box with an adhesive poured into the gap, and the protrusion portion is arranged toward the optical box from the holding member along a position in the gap into which the adhesive is poured to prevent the adhesive from falling off the position.

30 Claims, 10 Drawing Sheets

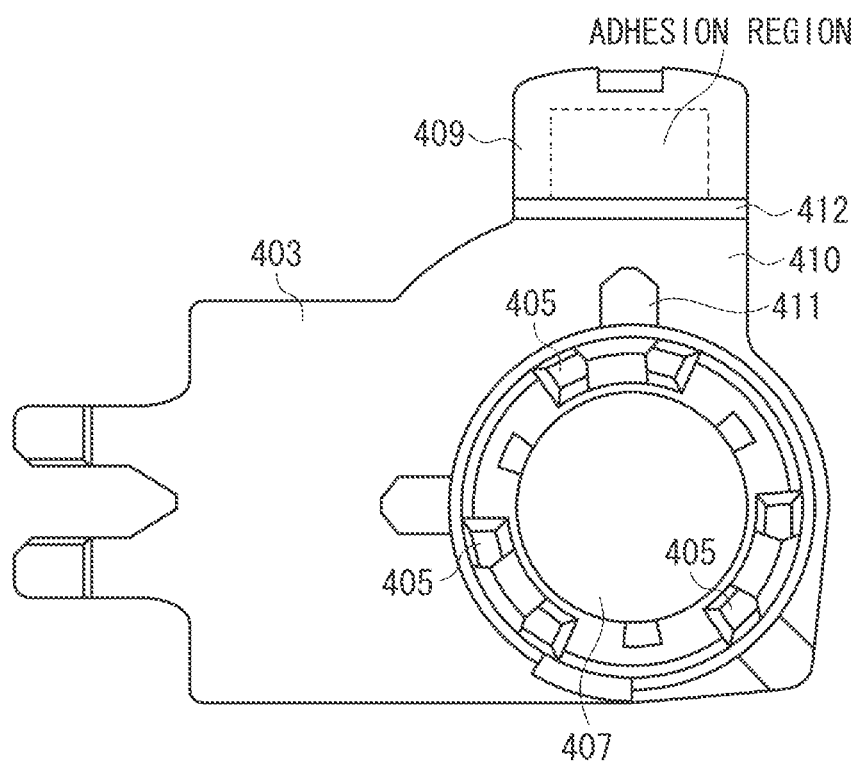

OPTICAL SCANNING APPARATUS AND IMAGE FORMING APPARATUS INCLUDING THE OPTICAL SCANNING APPARATUS

BACKGROUND OF THE INVENTION

1. Field of the Invention

The present invention relates to an optical scanning apparatus and a configuration for fixing a light source provided in an image forming apparatus that includes the optical scanning apparatus.

2. Description of the Related Art

In an electrophotographic image forming apparatus, a photosensitive member is exposed to a light beam emitted from an optical scanning apparatus to form an electrostatic latent image on the photosensitive member, and the electrostatic latent image is developed with toner to form an image. Such an optical scanning apparatus includes a light source that emits a light beam, a laser holder that holds the light source, a polygon mirror (rotating polygon mirror) that deflects the light beam emitted from the light source to scan the photosensitive member with the light beam, and an optical box to which the polygon mirror is attached. The light source is attached to the optical box via the laser holder.

Japanese Patent Application Laid-Open No. 2004-37836 discusses an optical scanning apparatus in which a laser holder is fixed to an optical box with an adhesive, instead of fixing the laser holder to the optical box with a screw, to reduce the number of components.

However, if the laser holder is fixed to the optical box with an adhesive that is applied or dropped into a gap formed between the optical box and the laser holder, the adhesive falls off an adhesion region in a gap between the optical box and the laser holder due to the gravity before the adhesive cures, as illustrated in FIGS. 10A and 10B. If an area coated with the adhesive increases in this way, the adhesive strength per unit area decreases, and thus the laser holder may easily come off the optical box by vibration or the like.

SUMMARY OF THE INVENTION

According to an aspect of the present invention, an optical scanning apparatus includes a light source configured to emit a light beam, a rotating polygon mirror configured to deflect the light beam emitted from the light source such that the light beam scans a photosensitive member, an optical box to which the rotating polygon mirror is attached and which includes a first portion, and a holding member configured to hold the light source, including a second portion and a protrusion portion, and attached to the optical box such that the first portion of the optical box and the second portion of the holding member form a gap therebetween, wherein the holding member is attached to the optical box with an adhesive poured into the gap, and the protrusion portion is arranged toward the optical box from the holding member along a position in the gap into which the adhesive is poured to prevent the adhesive from falling off the position.

Further features of the present invention will become apparent from the following description of exemplary embodiments with reference to the attached drawings.

BRIEF DESCRIPTION OF THE DRAWINGS

FIG. 7 is a front view of a light source unit.

DESCRIPTION OF THE EMBODIMENTS

Hereinafter, a first exemplary embodiment will be described.

(Image Forming Apparatus)

Figure 1:
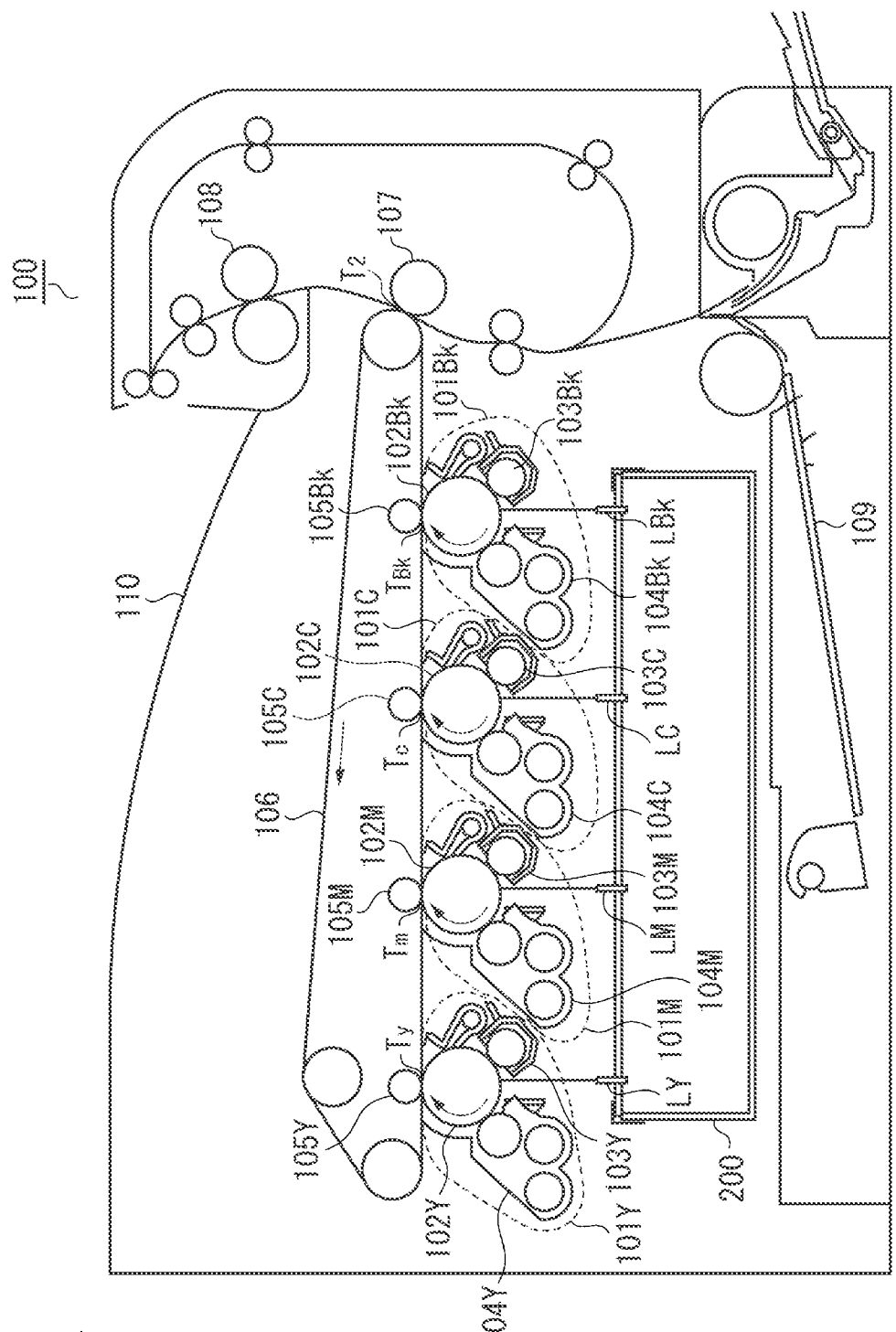
FIG. 1 is a schematic sectional view of an image forming apparatus.

FIG. 1 is a sectional view schematically illustrating an electrophotographic image forming apparatus 100. The image forming apparatus 100 illustrated in FIG. 1 includes four image forming units 101Y, 101M, 101C, and 101Bk that respectively form toner images in yellow, magenta, cyan, and black. The image forming units 101Y, 101M, 101C, and 101Bk include, respectively, photosensitive drums 102Y, 102M, 102C, and 102Bk, which are photosensitive members. The image forming units 101Y, 101M, 101C, and 101Bk further include, respectively, charging devices 103Y, 103M, 103C, and 103Bk for charging the respective photosensitive drums 102Y, 102M, 102C, and 102Bk.

An optical scanning apparatus 200 emits light beams (laser beams) LY, LM, LC, and LBk for exposing, respectively, the photosensitive drums 102Y, 102M, 102C, and 102Bk that have been charged by the respective charging devices 103Y, 103M, 103C, and 103Bk. Having been exposed to the light beams LY, LM, LC, and LBk, electrostatic latent images are formed on the respective photosensitive drums 102Y, 102M, 102C, and 102Bk.

The image forming unit 101Y includes a developing device 104Y, and the developing device 104Y develops an electrostatic latent image formed on the photosensitive drum 102Y with a yellow toner. The image forming unit 101M includes a developing device 104M, and the developing device 104M develops an electrostatic latent image formed on the photosensitive drum 102M with a magenta toner. The image forming unit 101C includes a developing device 104C, and the developing device 104C develops an electrostatic latent image formed on the photosensitive drum 102C with a cyan toner. The image forming unit 101Bk includes a developing device 104Bk, and the developing device 104Bk develops an electrostatic latent image formed on the photosensitive drum 102Bk with a black toner.

A yellow toner image formed on the photosensitive drum 102Y is transferred onto an intermediate transfer belt 106 by a transfer roller 105Y in a transfer portion T$_y$. A magenta toner image formed on the photosensitive drum 102M is transferred onto the intermediate transfer belt 106 by a transfer roller 105M in a transfer portion T$_m$. A cyan toner image formed on the photosensitive drum 102C is transferred onto the intermediate transfer belt 106 by a transfer roller 105C in a transfer portion T$_c$. A black toner image formed on the photosensitive drum 102Bk is transferred onto the intermediate transfer belt 106 by a transfer roller 105Bk in a transfer portion T$_{Bk}$.

The toner images of the respective colors transferred onto the intermediate transfer belt 106 are then transferred onto a recording sheet conveyed from a paper feed unit 109 by a transfer roller 107 in a transfer portion T$_2$. The toner images that have been transferred onto the recording sheet in the transfer portion T$_2$ are then fixed by a fixing device 108 and discharged to a paper discharge unit 110.

(Optical Scanning Apparatus)

Figure 2A:
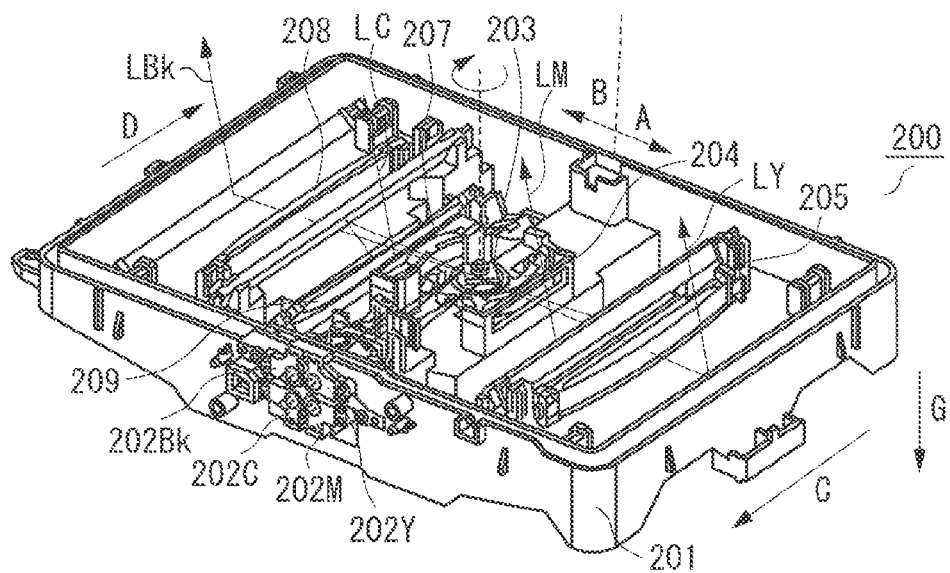
FIG. 2A is a perspective view of an optical scanning apparatus.

The optical scanning apparatus 200 will now be described. FIG. 2A is a perspective view illustrating a configuration of the optical scanning apparatus 200. An arrow G in FIG. 2A indicates the direction of the gravity.

Light source units 202Y, 202M, 202C, and 202Bk are attached to an outer wall of an optical box (housing) 201 of the optical scanning apparatus 200. The light source unit 202Y emits the laser beam LY to expose the photosensitive drum 102Y, and the light source unit 202M emits the laser beam LM to expose the photosensitive drum 102M. The light source unit 202C emits the laser beam LC to expose the photosensitive drum 102C, and the light source unit 202Bk emits the laser beam LBk to expose the photosensitive drum 102Bk.

Figure 2B:
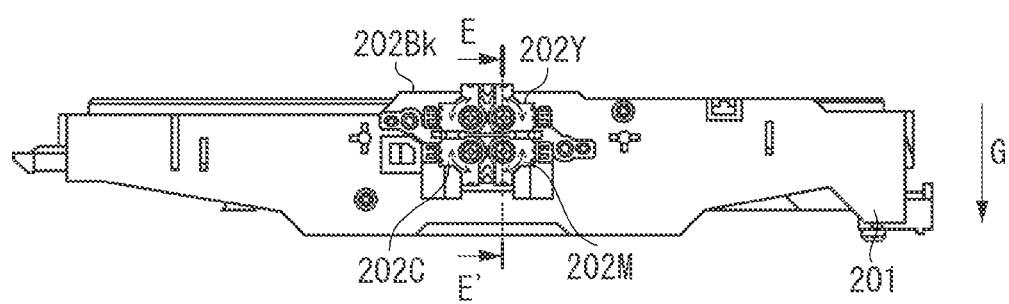
FIG. 2B is a side view of the optical scanning apparatus.

FIG. 2B is a side view of the optical scanning apparatus 200 as viewed from the side to which the light source units 202Y, 202M, 202C, and 202Bk are attached. As illustrated in FIG. 2B, the light source units 202Y, 202M, 202C, and 202Bk are arranged closely to one another. Arranging the light source units 202Y, 202M, 202C, and 202Bk closely to one another allows a single drive board (not illustrated) to drive the light source units 202Y, 202M, 202C, and 202Bk.

As illustrated in FIG. 2A, a polygon mirror (rotating polygon mirror) 203 having four reflection surfaces is provided at a center portion in the optical box 201. When forming an image, the polygon mirror 203 rotates about a rotational axis indicated by a dotted line in FIG. 2A in a direction of an arrow.

The laser beam LY emitted from the light source unit 202Y is incident on a reflection surface of the polygon mirror 203 and is reflected (deflected) by that reflection surface toward a side indicated by an arrow A in FIG. 2A. The laser beam LM emitted from the light source unit 202M is incident on the same reflection surface of the polygon mirror 203 as that on which the laser beam LY is incident, and is reflected by that reflection surface toward the same side as the laser beam LY is reflected.

Meanwhile, the laser beam LBk emitted from the light source unit 202Bk is incident on a reflection surface of the polygon mirror 203 that is different from the reflection surface on which the laser beams LY and LM are incident, and is deflected by that reflection surface toward a side indicated by an arrow B in FIG. 2A. The laser beam LC emitted from the light source unit 202C is incident on the same reflection surface of the polygon mirror 203 as that on which the laser beam LBk is incident, and is deflected by that reflection surface toward the same side as the laser beam LBk is reflected.

The laser beams LY and LM deflected by the polygon mirror 203 then move in a direction of an arrow C. That is, as being deflected by the rotating polygon mirror 203, the laser beam LY scans the photosensitive drum 102Y in the direction of the arrow C, and the laser beam LM scans the photosensitive drum 102M in the direction of the arrow C.

Meanwhile, the laser beams LBk and LC deflected by the polygon mirror 203 move in a direction of an arrow D. That is, as being deflected by the rotating polygon mirror 203, the laser beam LBk scans the photosensitive drum 102Bk in the direction of the arrow D, and the laser beam LC scans the photosensitive drum 102C in the direction of the arrow D.

Figure 3:
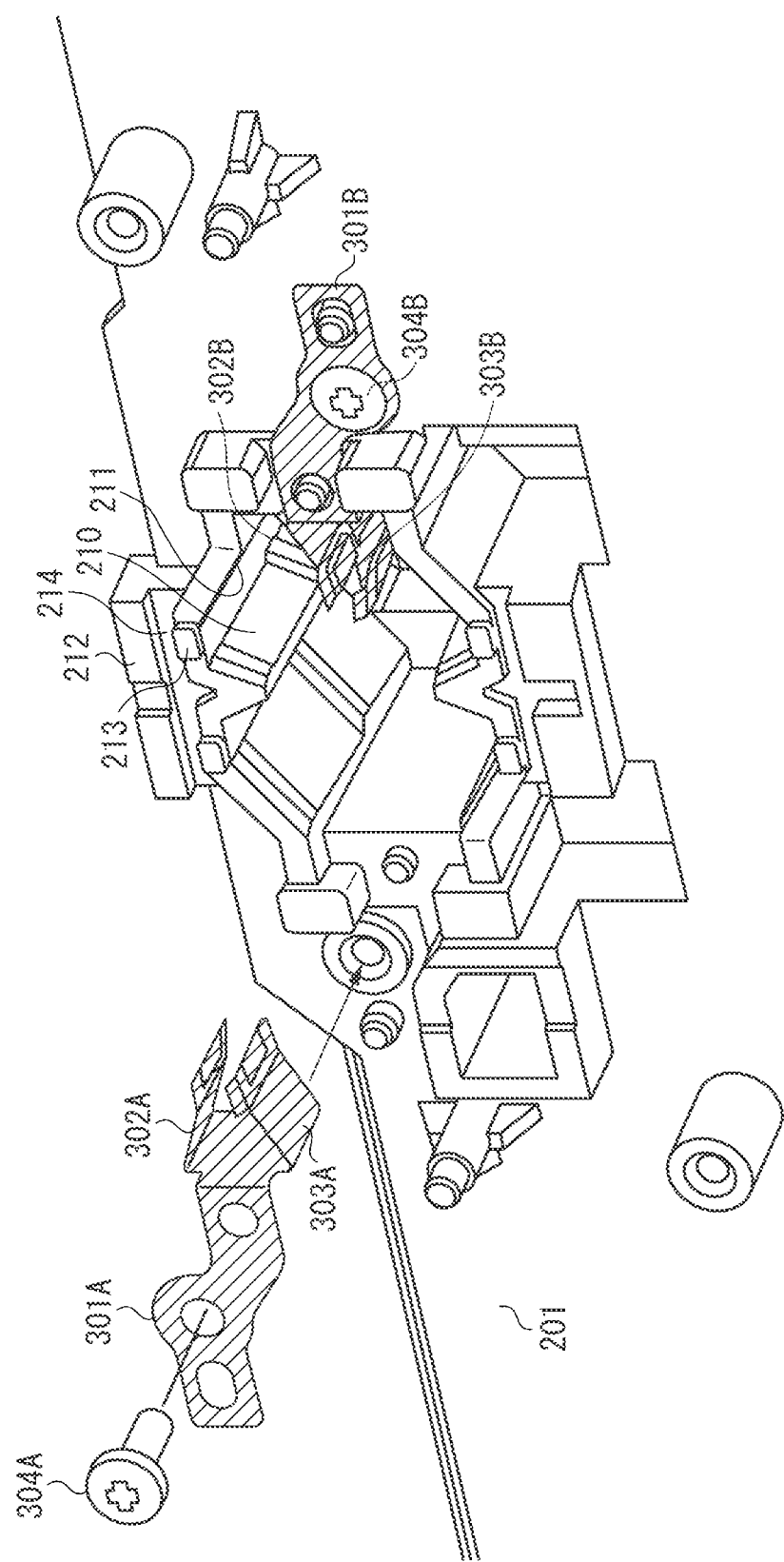
FIG. 3 is a perspective view of main components of an optical box.

The configuration for attaching a light source unit will now be described in detail. FIG. 3 is an enlarged view of an attachment portion to which the light source units 202Y, 202M, 202C, and 202Bk are attached.

FIG. 3 illustrates the optical box 201 and leaf springs (elastic members) 301A and 301B of the same shape for biasing the light source units 202Y, 202M, 202C, and 202Bk against the optical box 201. A leading end of the leaf spring 301A bifurcates into pressing portions 302A and 303A, and, similarly, a leading end of the leaf spring 301B bifurcates into pressing portions 302B and 303B. The leaf spring 301A is fixed to the optical box 201 with a screw 304A, and the leaf spring 301B is fixed to the optical box 201 with a screw 304B.

Figure 4A:
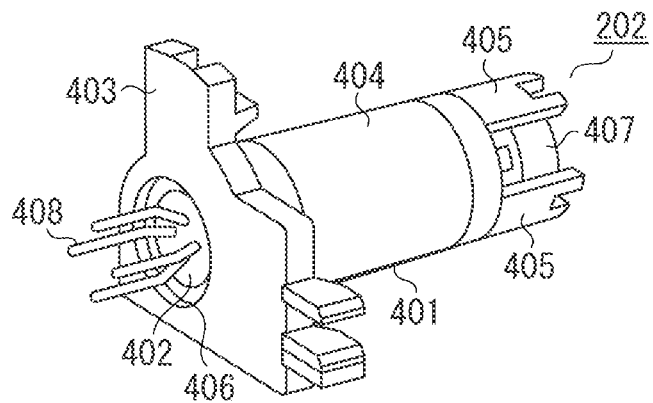
FIGS. 4A and 4B are perspective views of a light source unit.
Figure 4B:
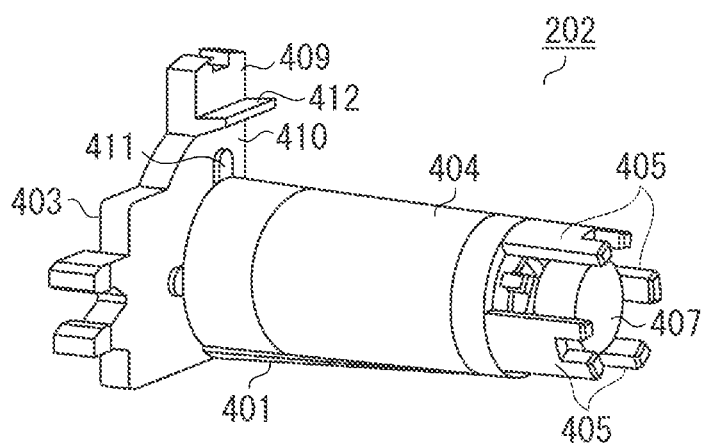

The light source units 202Y, 202M, 202C, and 202Bk will now be described with reference to FIGS. 4A and 4B. Each of the light source units 202Y, 202M, 202C, and 202Bk has the same configuration as one another, and thus the description will be given collectively as a light source unit 202 in FIGS. 4A and 4B. FIGS. 4A and 4B are perspective views of the light source unit 202 as viewed from respectively different sides.

As illustrated in FIG. 4A, a laser holder 401 (holding member) of the light source unit 202 includes a light source holding portion 403 for holding a semiconductor laser 402 serving as the light source, a lens barrel portion 404, and a lens holding portion 405 for holding a collimator lens 407. The light source holding portion 403, the lens barrel portion 404, and the lens holding portion 405 are integrally formed. An opening 406 is formed in the light source holding portion 403, and the semiconductor laser 402 is fitted into the opening 406. Electrodes 408 of the semiconductor laser 402 are electrically connected to the aforementioned drive board. The lens barrel portion 404 connects the light source holding portion 403 with the lens holding portion 405. The interior of the lens barrel portion 404 is hollow, through which a laser beam emitted from the semiconductor laser 402 can pass. The collimator lens 407 is positioned in the lens holding portion 405 relative to an optical path of the laser beam emitted from the semiconductor laser 402 at the time of assembling the light source unit 202 at a factory. The laser beam emitted from the semiconductor laser 402 passes through the lens barrel unit 405 and then is incident on the collimator lens 407. Then, the laser beam is collimated by the collimator lens 407 and emitted from the light source unit 202.

Further, as illustrated in FIG. 4B, the laser holder 401 includes a flat surface 409 (second surface, second portion), a flat surface 410, a flat surface 411, and a protrusion portion 412. The flat surface 410 is elevated from the flat surfaces 409 and 410. The protrusion portion 412 protrudes from the flat surfaces 409 and 410. These flat surfaces 409, 410, and 411 will be described below.

Figure 5:
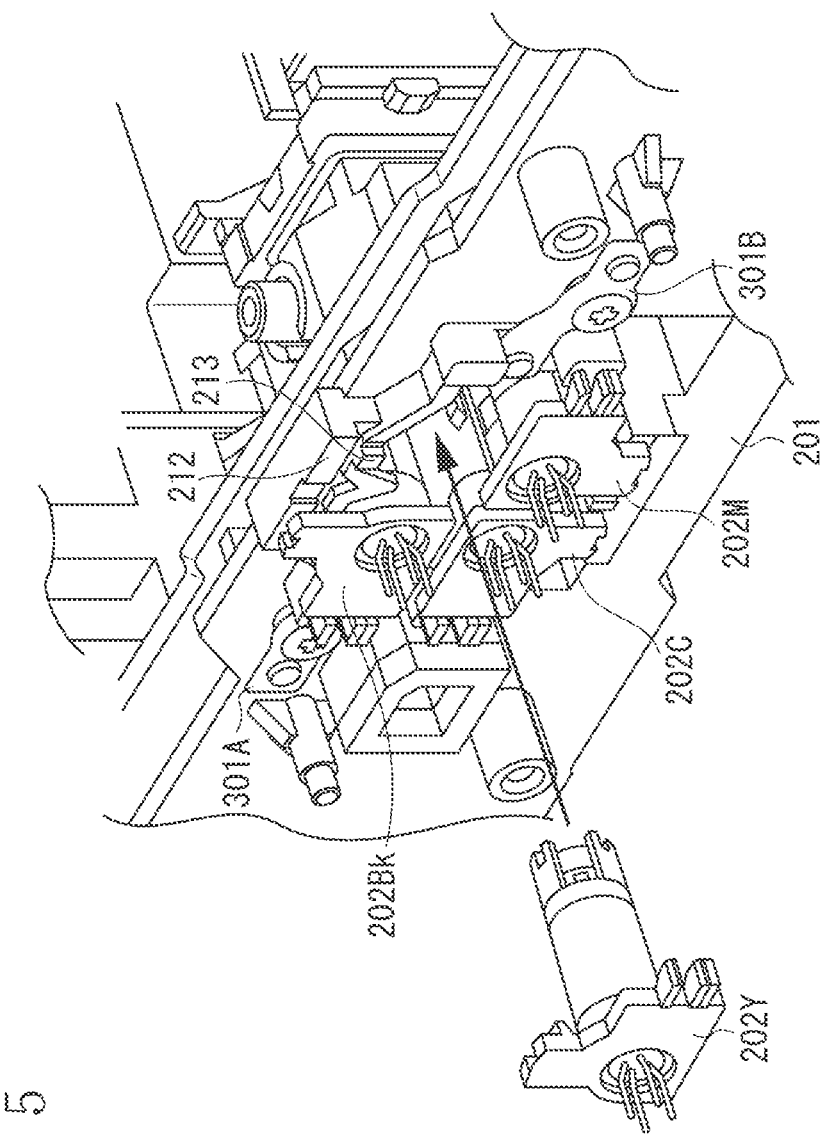
FIG. 5 is a perspective view of a light source unit and an optical box to which light source units are attached.

FIG. 5 illustrates the optical box 201 in a state where the light source units 202M, 202C, and 202Bk are attached to the optical box 201 and the light source unit 202Y is removed from the optical box 201. The light source unit 202Y is to be inserted into a through-hole provided in an outer wall of the optical box 201 in a direction of the arrow.

Here, the configuration for attaching the light source unit 202Y will be described in further detail with reference to FIGS. 3, 4A and 4B, and 5. The configuration and the method for attaching each of the light source units 202M, 202C, and 202Bk are the same as those for the light source unit 202Y. Thus, the description thereof will not be repeated.

The light source unit 202Y, which is to be inserted into the through-hole in the optical box 201 as illustrated in FIG. 5, is inserted into a gap defined by the pressing portion 302B of the leaf spring 301B and inner surfaces 210 and 211 of the through-hole illustrated in FIG. 3. As the light source unit 202Y is inserted into the through-hole, a lower side of the lens barrel portion 404 illustrated in FIGS. 4A and 4B causes the pressing portion 302B of the leaf spring 301B to elastically deform in a downward direction. The restoring force generated as the leaf spring 301B elastically deforms presses the lens barrel portion 404 upward with the pressing portion 302B. The lens barrel portion 404 that is pressed upward by the pressing portion 302B is biased against the inner surfaces 210 and 211. In other words, as the lens barrel portion 404 is pressed by the pressing portion 302B of the leaf spring 301B to be biased against the inner surfaces 210 and 211, the light source unit 202Y is tentatively fixed inside the through-hole.

In a state in which the light source unit 202Y is tentatively fixed inside the through-hole, the flat surface 409 of the light source unit 202Y illustrated in FIG. 4B faces a flat surface 212 provided in the optical box 201 illustrated in FIG. 3. Meanwhile, the flat surface 411 of the laser holder 401 contacts a flat surface 213 provided in the optical box 201 illustrated in FIG. 3. That is, when the light source unit 202Y is attached to the optical box 201, the light source unit 202Y is pushed into the through-hole in a direction of the arrow indicated in FIG. 5 until the flat surface 411 of the laser holder 401 contacts the flat surface 213 of the optical box 201. As the light source unit 202Y is pushed into the through-hole until the flat surface 411 of the laser holder 401 contacts the flat surface 213 of the optical box 201, the installation position of the light source unit 202Y in a focusing direction (i.e., the optical axis direction of the collimator lens 407) is determined.

Further, in a state in which the light source unit 202Y is tentatively fixed inside the through-hole, the protrusion portion 412 illustrated in FIG. 4B is inserted into a recess portion 214 formed between the flat surface 212 (first surface, first portion) and a flat surface 213 illustrated in FIG. 3 (i.e., a recess portion that is recessed relative to the flat surfaces 212 and 213, or an opening formed in the outer wall of the optical box 201). The light source unit 202Y and the optical box 201 are designed such that a gap is formed between the protrusion portion 412 and the inner surface of the recess portion 214 in a state in which the light source unit 202Y is tentatively fixed to the optical box 201. Such a gap formed between the protrusion portion 412 and the inner surface of the recess portion 214 enables a rotative adjustment of the light source unit 202Y, which will be described below.

The semiconductor laser 402 of the first exemplary embodiment is a device that includes a plurality of light-emitting elements each configured to emit a laser beam. With an apparatus in which an electrostatic latent image is formed on a photosensitive drum by a plurality of laser beams emitted from a plurality of light-emitting elements, spot spacing among the plurality of laser beams is adjusted at a factory such that the spot spacing (in a sub-scanning direction: spacing in a direction in which the photosensitive drum rotates) among the plurality of laser beams on the photosensitive drum is set to spacing that corresponds to the resolution of the image forming apparatus. For example, if the resolution of an output image of the image forming apparatus is 600 dpi, the spot spacing among the plurality of laser beams on the photosensitive drum is adjusted to 42.3 µm at a factory.

With the optical scanning apparatus 200 of the first exemplary embodiment, the light source units 202Y, 202M, 202C, and 202Bk are rotatively adjusted in directions of respective arrows indicated in FIG. 2B in a state in which the light source units 202Y, 202M, 202C, and 202Bk are tentatively fixed to the optical box 201 as described above. As the light source units 202Y, 202M, 202C, and 202Bk are being rotated, each of the light source units 202Y, 202M, 202C, and 202Bk rotates about the rotational axis, which passes through the center of the circular cross-section surface of the lens barrel portion 404. Along with the rotation of the light source units 202Y, 202M, 202C, and 202Bk, the semiconductor laser 402 fitted in each of the light source units 202Y, 202M, 202C, and 202Bk also rotates in the directions of the respective arrows. Accordingly, the optical scanning apparatus 200 of the first exemplary embodiment can adjust the spot spacing among the plurality of laser beams by the rotation of the light source units 202Y, 202M, 202C, and 202Bk.

When the optical scanning apparatus 200 of the first exemplary embodiment is being assembled, a photo-curable adhesive is applied or dropped (poured) to fill a predetermined adhesion region (position) in the gap formed between the flat surface 212 of the optical box 201 and the flat surface 409 of the laser holder 401 prior to rotating the light source unit 202 to adjust the installation position thereof. Then, after rotating the light source unit 202 to adjust the installation position thereof, the adhesive that has been applied to the adhesion region is irradiated with ultraviolet light through an end of the gap to cure the adhesive.

It is also contemplated to fill the gap between the flat surface 212 of the optical box 201 and the flat surface 409 of the laser holder 401 with the adhesive after rotating the light source unit 202 for the adjustment. However, if the gap is to be filled with the adhesive after the adjustment, the adhesive may not sufficiently reach the adhesion region since the gap between the flat surface 212 of the optical box 201 and the flat surface 409 of the laser holder 401 is narrow. Accordingly, it is desirable to apply the adhesive on the flat surface 212 of the optical box 201 or the flat surface 409 of the laser holder 401 prior to adjusting the installation position of the light source unit 202. Alternatively, it is desirable to drop the adhesive into the gap between the flat surface 212 of the optical box 201 and the flat surface 409 of the laser holder 401 while the gap is still wide prior to adjusting the installation position of the light source unit 202.

(Mechanism for Preventing Adhesive from Falling Off)

Figure 10A:
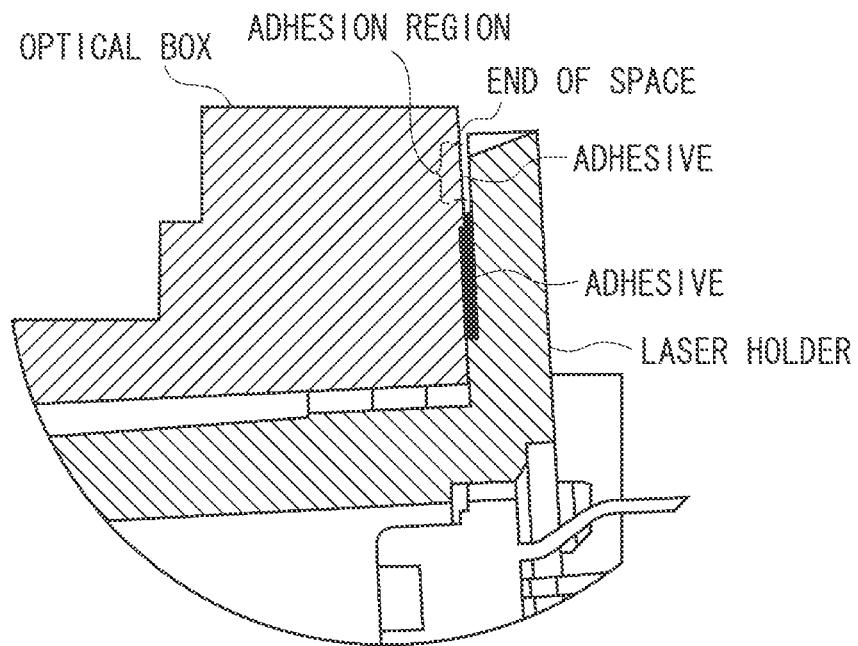
FIGS. 10A and 10B illustrate a configuration for attaching a laser holder (light source unit) according to an existing technique.
Figure 10B:
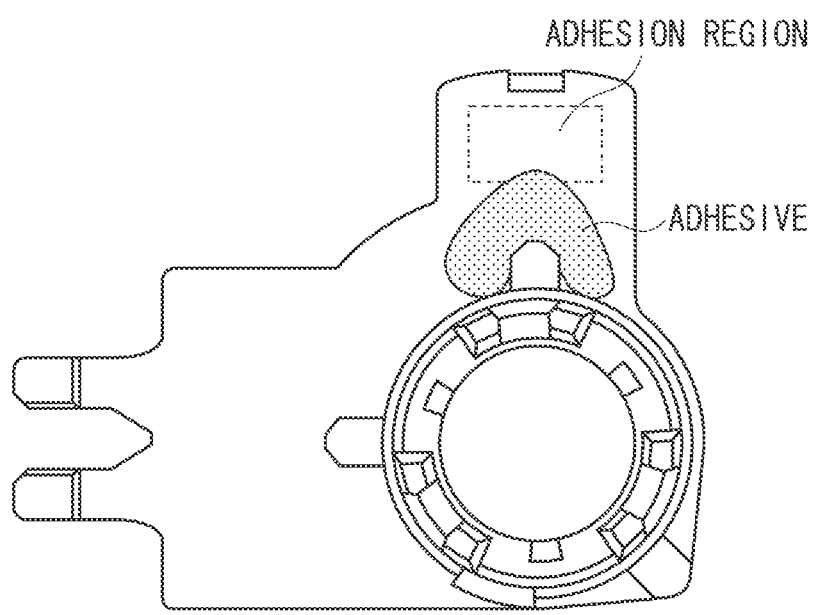

In an existing technique, a light source unit is fixed to an optical box by filling a gap between the light source unit and the optical box an adhesive, as illustrated in FIG. 10A. As such an adhesive, for example, a photo-curable adhesive that is cured by being irradiated with ultraviolet light is used. However, the adhesive falls in the direction of the gravity off a portion of an adhesive region, which is closer to the end of the gap and which the ultraviolet light reaches sufficiently while the installation position of the light source unit is adjusted, as illustrated in FIG. 10B. Thus, the ultraviolet light does not reach the adhesive when curing the adhesive, which results in a portion of the adhesive not being cured. As a result, the adhesion of the light source unit to the optical box may be insufficient, which leads to an issue in that the light source unit easily comes off the optical box due to vibration or the like.

Accordingly, the protrusion portion 412 that protrudes from the flat surfaces 409 and 410 of the light source holding portion 403 is formed in the laser holder 401 of the light source unit 202 of the first exemplary embodiment, as illustrated in FIG. 4B.

Figure 6A:
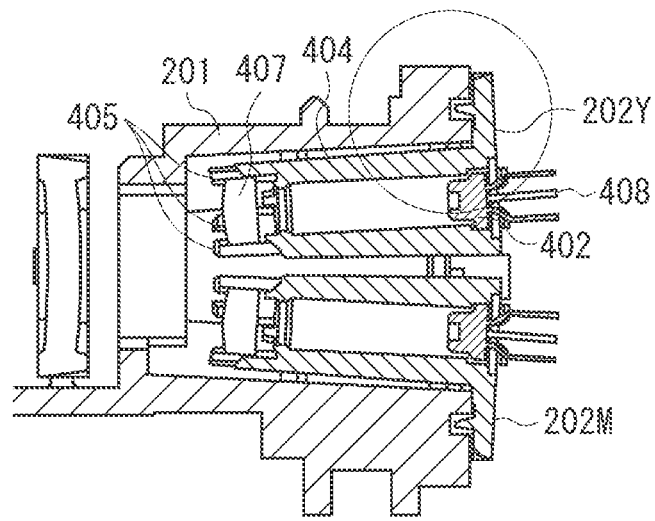
FIGS. 6A, 6B, and 6C are sectional views of a light source unit and an optical box to which the light source unit is attached according to a first exemplary embodiment.
Figure 6B:
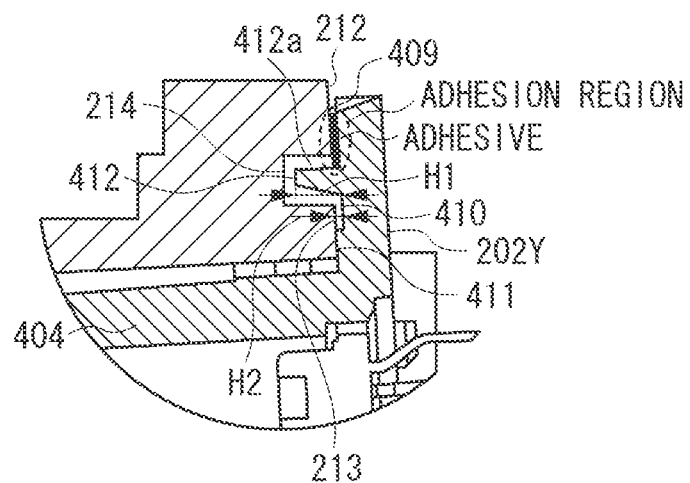

The aforementioned point will be described in further detail with reference to FIGS. 6A, 6B, and 6C. FIG. 6A is a sectional view taken along the line E-E' indicated in FIG. 2B, and FIG. 6B is an enlarged view of a section indicated with a circular frame in FIG. 6A. The flat surface 409 of the laser holder 401 and the flat surface 212 of the optical box 201 face each other without contacting each other, and an adhesion region in a gap formed between the flat surfaces 409 and 212 is filled with an adhesive. Further, the flat surface 410 of the laser holder 401 and the flat surface 213 of the optical box 201 face each other, and the flat surface 411 that is elevated from the flat surface 410 of the laser holder 401 contacts the flat surface 213 of the optical box 201.

The laser holder 401 includes the protrusion portion 412 (vertical portion) that includes a vertical surface 412a and protrudes (is vertically arranged) between the flat surfaces 409 and 410 toward the optical box 201 from the flat surfaces 409 and 410. The angle of the vertical surface 412a with respect to the flat surface 409 is desirably an acute angle of less than 90 degrees. Meanwhile, the recess portion 214 is formed between the flat surface 212 of the optical box 201 that faces the flat surface 409 of the laser holder 401, and the flat surface 213 of the optical box 201 that faces the flat surface 410 of the laser holder 401. The protrusion portion 412 is to be inserted into the recess portion 214. That is, a height H1 of the protrusion portion 412 from the flat surface 410 is greater than the width of the gap formed by the flat surface 212 and the flat surface 409 and is also greater than a height H2 of the flat surface 411 from the flat surface 410. Further, in a state in which the flat surface 411 contacts the flat surface 213, the vertical surface 412a of the protrusion portion 412 is inserted into the recess portion 214.

It is desirable that the protrusion portion 412 does not contact the inner surface of the recess portion 214. If the protrusion portion 412 contacts the inner surface of the recess portion 214 while the light source unit 202 is rotated relative to the optical box 201 before the adhesive is cured, such contact hinders the rotation of the light source unit 202. Accordingly, the spot spacing among the plurality of laser beams on the photosensitive drums cannot be adjusted to the spacing that corresponds to the resolution of the image forming apparatus.

FIG. 7 is a front view of the light source unit 202Y as viewed from the side of the collimator lens 407. A region surrounded by a dotted line in FIG. 7 is the adhesion region to be filled with the adhesive. The protrusion portion 412 protrudes to the front side of the plane of paper in FIG. 7 from the flat surfaces 409 and 410 along a side of the adhesion region.

Providing the protrusion portion 412 in such a manner makes it possible to prevent an uncured adhesive from falling off the adhesion region due to the gravity. The light source unit 202 of the first exemplary embodiment is particularly effective when a photo-curable adhesive is used as the adhesive. That is, if the adhesive falls to a position where light does not easily reach as illustrated in FIG. 10B, the adhesive cannot be cured sufficiently even if the ultraviolet light is applied. On the other hand, providing the protrusion portion 412 makes it possible to prevent the uncured adhesive from falling off the adhesion region due to the gravity.

Figure 6C:
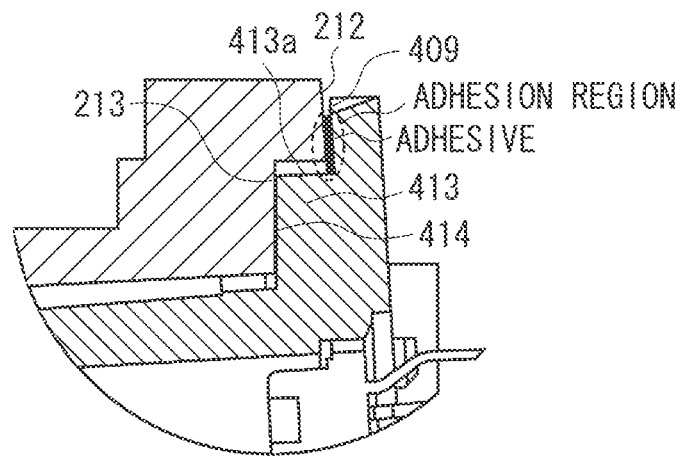

Here, although the protrusion portion 412 illustrated in FIG. 6B protrudes from both the flat surfaces 409 and 410, a similar effect can be obtained even with the configuration illustrated in FIG. 6C. In the configuration, a protrusion portion 413 protrudes only from the flat surface 409 to form a vertical surface 413a that is vertically arranged from the flat surface 409, and a leading end 414 of the protrusion portion 413 contacts the flat surface 213 of the optical box 201.

When an adhesive that fills a gap between the light source units 202Y and 202Bk and the optical box 201 is irradiated with ultraviolet light, the bottom surface of the optical box 201 is set lower than a side, to which a lid member is attached, in the gravitational direction as illustrated in FIGS. 2A and 2B. Meanwhile, when an adhesive that fills a gap between the light source units 202M and 202C and the optical box 201 is irradiated with ultraviolet light, the bottom surface of the optical box 201 is set higher than a side, to which a lid member is attached, in the gravitational direction. Accordingly, the light source units 202M and 202C of the first exemplary embodiment have the same configurations as the light source units 202Y and 202Bk.

Figure 8A:
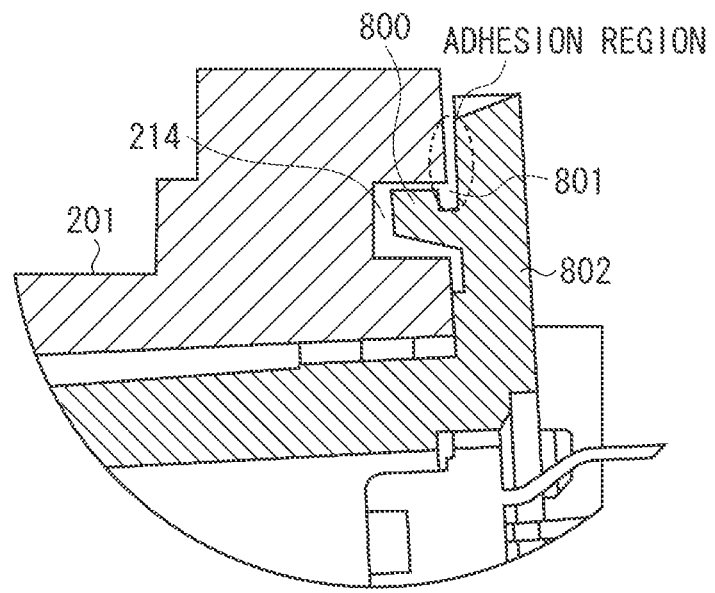
FIG. 8A is a sectional view of a light source unit and an optical box to which the light source unit is attached according to a second exemplary embodiment.
Figure 8B:
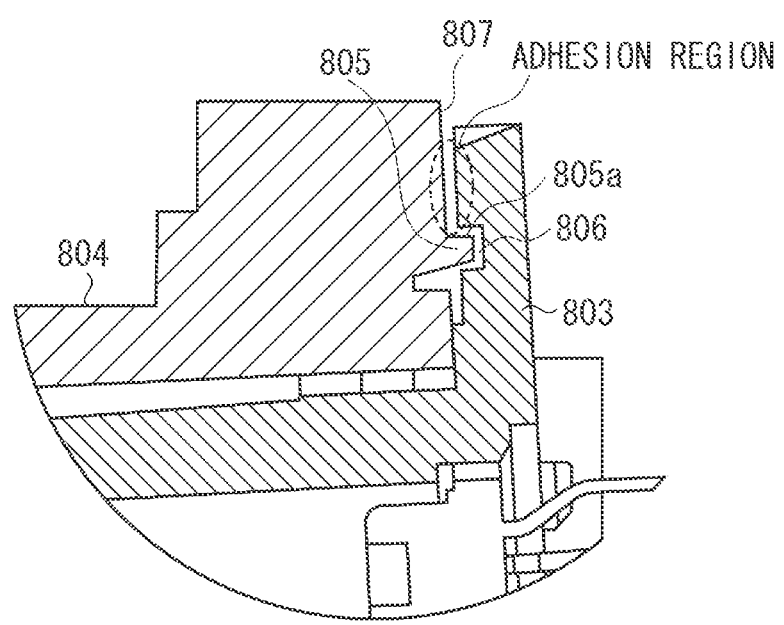
FIG. 8B is a sectional view of a light source unit and an optical box to which the light source unit is attached according to a third exemplary embodiment.

Hereinafter, the protrusion portion 412 of other exemplary embodiments will be described with reference to FIGS. 8A and 8B. To simplify the description, only parts that differ from the above-described first exemplary embodiment will be described.

A second exemplary embodiment will be described. A light source unit 802 illustrated in FIG. 8A includes a protrusion portion 800 having a leading end that is curved or bent toward an adhesion region. By bending the leading end of the protrusion portion 800 toward the adhesion region, a retaining portion 801 for retaining the adhesive can be formed, as illustrated in FIG. 8A. If it takes a long time to adjust the installation position of the light source unit 802 and if an adhesive having low viscosity is used, the protrusion portion 412 of the shape described in the first exemplary embodiment may allow the adhesive to flow into the gap formed between an upper surface of the protrusion portion 412 and an upper surface of the recess portion 214. On the other hand, since the protrusion portion 800 of the light source unit 802 of the second exemplary embodiment includes the retaining portion 801, even if it takes a long time to make the adjustment, the adhesive can be retained at the adhesion region.

A third exemplary embodiment will now be described. FIG. 8B illustrates an optical box 804 that includes a flat surface 807 (first surface) and a protrusion portion 805 and a light source unit (holding member) 803 that includes a recess portion 806. The protrusion portion 805 protrudes from the flat surface 807 toward the light source unit 803. The protrusion portion 805 includes a vertical surface 805a that is vertically arranged from the flat surface 807. The vertical surface 805a functions similarly to the vertical surface 412a of the first exemplary embodiment. Note that, by bending a leading end of the protrusion portion 805 toward the adhesion region as in the second exemplary embodiment, the protrusion portion 805 may be configured to include a retaining portion.

Figure 9:
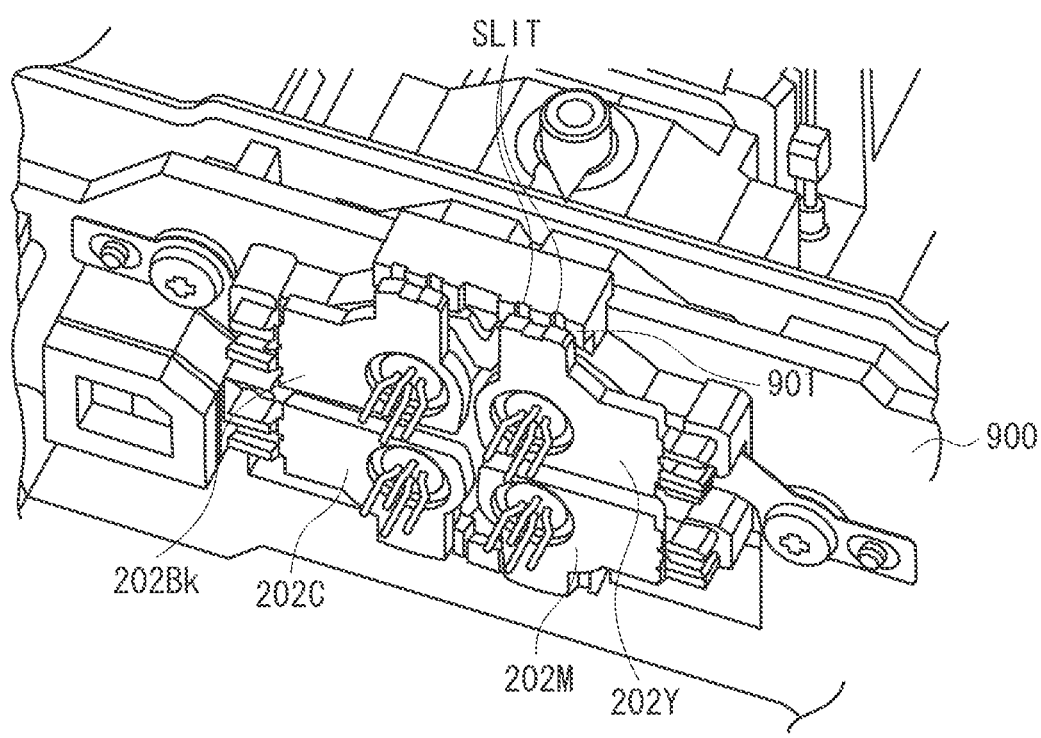
FIG. 9 is a perspective view of a light source unit and an optical box to which the light source unit is attached according to a fourth exemplary embodiment.

A fourth exemplary embodiment will now be described. FIG. 9 is an enlarged view of the vicinity of a portion where light source units are attached in the fourth exemplary embodiment. An optical box 900 of the fourth exemplary embodiment differs from the optical box 201 of the first exemplary embodiment in that slits are formed in a surface 901 that corresponds to the flat surface 212 of the optical box 201 in the first exemplary embodiment. That is, unlike the flat surface 212, the surface 900 is formed of a plurality of flat surfaces having elevations. Two slits formed in the optical box 901 of the fourth exemplary embodiment extend from the upper end of the surface 901 to the lower end thereof that is located above the protrusion portion 412 of the light source unit 202. The photo-curable adhesive is injected into the two slits. These two slits allow the ultraviolet light to easily enter the gap formed between the light source unit 202 and the optical box 900, which can prevent a portion of the uncured adhesive from occurring.

According to the exemplary embodiments of the present invention, the adhesive can be prevented from falling off the adhesion region due to the gravity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-140741 filed Jun. 22, 2012, which is hereby incorporated by reference herein in its entirety.

What is claimed is:

1. An optical scanning apparatus comprising:
a light source configured to emit a light beam;
a rotating polygon mirror configured to deflect the light beam emitted from the light source such that the light beam scans a photosensitive member;
an optical box to which the rotating polygon mirror is attached, the optical box including a first portion; and
a holding member configured to hold the light source, including a second portion and a protrusion portion, and attached to the optical box such that the first portion of the optical box and the second portion of the holding member form a gap therebetween and the protrusion portion does not contact to the optical box, wherein the holding member is attached to the optical box with an adhesive poured into the gap, and the protrusion portion is arranged toward the optical box from the holding member along a position in the gap into which the adhesive is poured and is disposed under the position in a vertical direction to prevent the adhesive from falling off the position.

2. The optical scanning apparatus according to claim 1, wherein the optical box includes a recess portion into which the protrusion portion is to be inserted.

3. The optical scanning apparatus according to claim 2, wherein a leading end of the protrusion portion is curved or bent toward the position in the gap into which the adhesive is poured.

4. The optical scanning apparatus according to claim 1, wherein the optical box includes an opening into which the protrusion portion is to be inserted.

5. The optical scanning apparatus according to claim 4, wherein a leading end of the protrusion portion is curved or bent toward the position in the gap into which the adhesive is poured.

6. The optical scanning apparatus according to claim 1, wherein an angle formed by the second portion and the protrusion portion is an acute angle of less than 90 degrees.

7. The optical scanning apparatus according to claim 1, wherein the adhesive includes a photo-curable adhesive, and
wherein the holding member is attached to the optical box with the adhesive that is poured into the gap and is cured by being irradiated with light through an end of the gap.

8. The optical scanning apparatus according to claim 1, wherein the light source includes a plurality of light-emitting elements each configured to emit the light beam and the light beams emitted from the plurality of light-emitting elements scans the photosensitive member deflected by the rotating polygon mirror.

9. An image forming apparatus comprising:
the optical scanning apparatus according to claim 1;
the photosensitive member; and
a developing unit configured to form an image on the photosensitive member by being exposed to the light beam emitted from the optical scanning apparatus.

10. An optical scanning apparatus comprising:
a light source configured to emit a light beam;
a rotating polygon mirror configured to deflect the light beam emitted from the light source such that the light beam scans a photosensitive member;
a holding member configured to hold the light source, the holding member including a second portion; and
an optical box to which the rotating polygon mirror is attached, the optical box including a first portion and a protrusion portion, and to which the holding member is attached to the optical box such that the second portion of the holding member and the first portion of the optical box form a gap therebetween and the protrusion portion does not contact to holding member, wherein the holding member is attached to the optical box with an adhesive poured into the gap and the protrusion portion is arranged from the optical member toward the holding member along a position in the gap into which the adhesive is poured and is disposed under the position in a vertical direction to prevent the adhesive from falling off the position.

11. The optical scanning apparatus according to claim 10, wherein the holding member includes a recess portion into which the protrusion portion is to be inserted.

12. The optical scanning apparatus according to claim 11, wherein a leading end of the protrusion portion is curved or bent toward the position in the gap into which the adhesive is poured.

13. The optical scanning apparatus according to claim 10, wherein the holding member includes an opening into which the protrusion portion is to be inserted.

14. The optical scanning apparatus according to claim 10, wherein an angle formed by the first portion and the protrusion portion is an acute angle of less than 90 degrees.

15. The optical scanning apparatus according to claim 10, wherein a leading end of the protrusion portion is curved or bent toward the position in the gap into which the adhesive is poured.

16. The optical scanning apparatus according to claim 10, wherein the adhesive includes a photo-curable adhesive, and
wherein the holding member is attached to the optical box with the adhesive that is poured into the gap and is cured by being irradiated with light through an end of the gap.

17. The optical scanning apparatus according to claim 10, wherein the light source includes a plurality of light-emitting elements each configured to emit a light beam.

18. The optical scanning apparatus according to claim 17, wherein a space between exposing spots of the light beams on the photosensitive member is adjusted, and the holding member is fixed to the optical box after an adjustment of the space between the exposing spots of the light beams on the photosensitive member.

19. An image forming apparatus comprising:
the optical scanning apparatus according to claim 10;
the photosensitive member; and
a developing unit configured to form an image on the photosensitive member by being exposed to the light beam emitted from the optical scanning apparatus.

20. The optical scanning apparatus according to claim 10, wherein the optical box includes a first contacting potion and the holding member includes a second contacting portion, wherein the holding member is attached to the optical box such that the second contacting portion contacts the first contacting portion, wherein the gap is formed between the first position and the second position by the second contacting portion contacting the first contacting portion, wherein a contacting portion of the first contacting potion and the second contacting potion is disposed at a position different from the position between an adhesive position and the protrusion portion.

21. The optical scanning apparatus according to claim 20, wherein the contacting portion is disposed under the protrusion portion in the vertical direction.

22. An optical scanning apparatus comprising:
a light source configured to emit a light beam;
a rotating polygon mirror configured to deflect the light beam emitted from the light source such that the light beam scans a photosensitive member;
an optical box to which the rotating polygon mirror is attached, the optical box including a first surface and a first contacting portion; and
a holding member configured to hold the light source, including a second surface, a protrusion portion and a second contacting portion, and attached to the optical box such that the second contacting portion contacts the first contacting portion, wherein a gap is formed between the first surface and the second surface by the second contacting portion contacting the first contacting portion, the protrusion portion is arranged toward the optical box from the holding member along a position in the gap into which the adhesive is poured and is disposed under the position in a vertical direction to prevent the adhesive from falling off the position, and the contacting portion of the first contacting portion and the second contacting portion is disposed at a position different from the position between an adhesive position and the protrusion portion.

23. The optical scanning apparatus according to claim 22, wherein the optical box includes a recess portion into which the protrusion portion is to be inserted.

24. The optical scanning apparatus according to claim 22, wherein the optical box includes an opening into which the protrusion portion is to be inserted.

25. The optical scanning apparatus according to claim 24, wherein a leading end of the protrusion portion is curved or bent toward the position in the gap into which the adhesive is poured.

26. The optical scanning apparatus according to claim 22, wherein an angle formed by the second surface and the protrusion portion is an acute angle of less than 90 degrees.

27. The optical scanning apparatus according to claim 22, wherein the adhesive includes a photo-curable adhesive, and
wherein the holding member is attached to the optical box with the adhesive that is poured into the gap and is cured by being irradiated with light through an end of the gap.

28. The optical scanning apparatus according to claim 22, wherein the light source includes a plurality of light-emitting elements each configured to emit the light beam and the light beams emitted from the plurality of light-emitting elements scans the photosensitive member deflected by the rotating polygon minor.

29. The optical scanning apparatus according to claim 22, wherein the contacting portion is disposed under the protrusion portion in the vertical direction.

30. An image forming apparatus comprising:
the optical scanning apparatus according to claim 22;
the photosensitive member; and
a developing unit configured to form an image on the photosensitive member by being exposed to the light beam emitted from the optical scanning apparatus.

* * * * *